(12) United States Patent
De Magalhaes et al.

(10) Patent No.: US 11,176,511 B2
(45) Date of Patent: Nov. 16, 2021

(54) ITEM TRANSPORTATION MANAGEMENT

(71) Applicant: International Business Machines Corporation, Armonk, NY (US)

(72) Inventors: Arthur De Magalhaes, Markham (CA); Vuk Svilaric, Toronto (CA); Leo Anthony Christy Jesuraj, Bowmanville (CA); Felix Wong, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 16/239,986

(22) Filed: Jan. 4, 2019

(65) Prior Publication Data

US 2020/0219048 A1 Jul. 9, 2020

(51) Int. Cl.

| | |
|---|---|
| *G06Q 10/08* | (2012.01) |
| *G06N 20/00* | (2019.01) |
| *G06K 9/62* | (2006.01) |
| *G06F 40/205* | (2020.01) |
| *G06F 40/30* | (2020.01) |
| *G06K 9/00* | (2006.01) |
| *G06K 9/32* | (2006.01) |

(Continued)

(52) U.S. Cl.
CPC ......... *G06Q 10/0832* (2013.01); *G06F 40/10* (2020.01); *G06K 9/325* (2013.01); *G06K 9/6201* (2013.01); *G06N 20/00* (2019.01); *G06F 9/542* (2013.01)

(58) Field of Classification Search
CPC .... G06Q 10/0832; G06N 20/00; G06F 40/10; G06F 9/542; G06K 9/325
See application file for complete search history.

(56) References Cited

U.S. PATENT DOCUMENTS

| | | | |
|---|---|---|---|
| 9,518,861 | B2 | 12/2016 | Aumente |
| 9,563,913 | B1 | 2/2017 | Bender et al. |

(Continued)

FOREIGN PATENT DOCUMENTS

| | | |
|---|---|---|
| EP | 3171301 A1 | 5/2017 |
| WO | 2016166686 A1 | 10/2016 |

OTHER PUBLICATIONS

Cognitive Packing Software using Personalized Profile, Feb. 10, 2017, IP.com, IPCOM000249232D. (Year: 2017).*

(Continued)

*Primary Examiner* — Kevin H Flynn
*Assistant Examiner* — Carter P Brockman
(74) *Attorney, Agent, or Firm* — James L. Olsen

(57) ABSTRACT

Aspects of the present disclosure relate to item transportation management. Package characteristics of a first package are determined. A set of unstructured data is processed to determine a transportation constraint associated with a transportation path. The package characteristics of the first package are compared to the transportation constraint. A determination is made that the package characteristics of the first package do not satisfy the transportation constraint based on the comparison. A reconfiguration recommendation is then issued to an individual associated with the first package in response to the determination that the package characteristics of the first package do not satisfy the transportation constraint.

12 Claims, 9 Drawing Sheets

(51) Int. Cl.
*G06F 40/10* (2020.01)
*G06F 9/54* (2006.01)

(56) References Cited

U.S. PATENT DOCUMENTS

| | | | |
|---|---|---|---|
| 2013/0046711 A1* | 2/2013 | Reiz | G06Q 50/14 |
| | | | 705/400 |
| 2013/0218799 A1* | 8/2013 | Lehmann | G06Q 10/083 |
| | | | 705/337 |
| 2014/0351265 A1* | 11/2014 | Beaurepaire | G06F 17/00 |
| | | | 707/748 |
| 2018/0068180 A1* | 3/2018 | Harary | G06K 9/4676 |

OTHER PUBLICATIONS

SITA, "Baggage Management", Track and manage bags from check-in to final destination, comply with Resolution 753, printed Oct. 23, 2018, 7 pages http://www.sita.aero/solutions-and-services/solutions/baggage-management.

Anonymous, "Cognitive Packing Software using Personalized Profile", An IP.com Prior Art Database Technical Disclosure, IP.com No. IPCOM000249232D, IP.com Electronic Publication Date: Feb. 10, 2017, 3 pages.

Mell et al., "The NIST Definition of Cloud Computing", Recommendations of the National Institute of Standards and Technology, Sep. 2011, 7 pages.

\* cited by examiner

ITEM TRANSPORTATION MANAGEMENT

BACKGROUND

The present disclosure relates generally to the field of transportation, and more particularly to item transportation management.

Traveling is increasingly popular among individuals as it becomes more affordable and wide-spread. Further, the many transportation options (e.g., light rails, airplanes, buses, taxis, peer-to-peer ride sharing, etc.) provide greater flexibility for individuals when they are determining how to reach a destination within a particular time-frame and budget.

SUMMARY

Embodiments of the present disclosure include a method, computer program product, and system for item transportation management. Package characteristics of a first package can be determined. A set of unstructured data can be processed to determine a transportation constraint associated with a transportation path. The package characteristics of the first package can then be compared to the transportation constraint. A determination can be made that the package characteristics of the first package do not satisfy the transportation constraint based on the comparison. A reconfiguration recommendation can then be issued to an individual associated with the first package in response to the determination that the package characteristics of the first package do not satisfy the transportation constraint.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
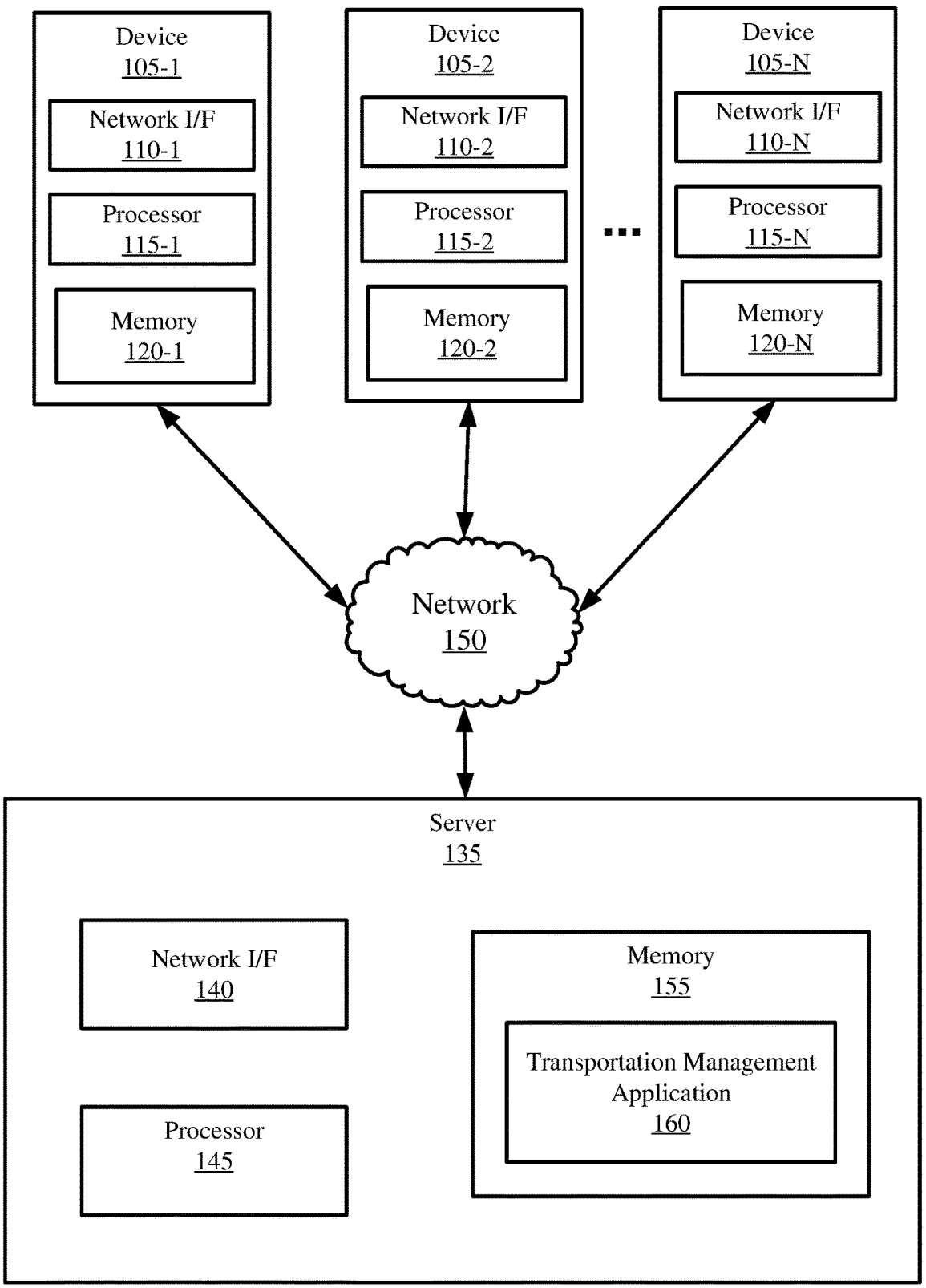
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of transportation, and more particularly to item transportation management. While the present disclosure is not necessarily limited to such applications, various aspects of the disclosure can be appreciated through a discussion of various examples using this context.

Traveling is becoming increasingly popular as transportation becomes more affordable and wide-spread. Further, the many transportation options (e.g., light rails, airplanes, buses, taxis, peer-to-peer ride sharing, etc.) provide greater flexibility for individuals when they are determining how to reach a destination within a particular time-frame and budget.

As transportation options increase, package (e.g., luggage, suitcases, briefcases, backpacks, boxes, plastic wrapped items, golf bags, etc.) restrictions (e.g., size, weight, and quantity restrictions) become burdensome. For example, package restrictions can depend on the mode of transportation (e.g., airplane vs. train vs. car vs. boat), the model of the vehicle (e.g., a van vs. a sedan, a light rail vs. a train, etc.), the transportation provider (e.g., an airline, rental service, taxi, etc.) facilitating the transport, etc. Traveling from one destination to another can entail multiple rounds of flights, ground transportation, and/or marine travel. Each round of transportation may have unique package restrictions. As such, it can be difficult for individuals to track whether their packages will be suitable for the entirety of transportation paths (e.g., a single flight or car ride) within a given transportation route (e.g., the total trip).

This is amplified when individuals traveling are adding items to, and/or removing items from, their packages between transportation paths within a transportation route. For example, an individual may drop gifts off along their travel and later purchase additional gifts to bring back home. By adding and/or removing items along the transportation route, the package characteristics (e.g., size and weight) can change, and thus it becomes increasingly difficult to ensure compliance with restrictions along the way.

Aspects of the present disclosure address the aforementioned complications via a transportation management system. The transportation management system can be configured to determine package characteristics (e.g., the weight of each package, the size of each package, the number of packages, etc.) for a traveling individual. The transportation management can further be configured to determine transportation restrictions (e.g., package quantity limits, weight restrictions, package size constraints, etc.) associated with each transportation path within a transportation route. The transportation management system can be configured to determine whether the package characteristics satisfy the transportation constraints. If a determination is made that the package characteristics do not satisfy the transportation constraints, a reconfiguration recommendation can be recommended. In embodiments, the reconfiguration recommendation can specify item(s) to be added or removed from packages, package(s) to be replaced (e.g., with smaller packages), or transportation methods to be altered (e.g., switching from ground transportation to a flight).

In embodiments, the transportation management application can further be configured to actively track an individual's package characteristics over time. That is, based on updates to the individual's package (e.g., added or removed items), package characteristics can be approximated (e.g., using image processing or natural language processing techniques) in real-time such that compliance with remaining transportation constraints can be ensured.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a transportation management application 160. The transportation management application 160 can be configured to aid in decision making for a traveler. For example, the transportation management application 160 can be configured to analyze (e.g., using natural language processing) transportation information (e.g., travel tickets, receipts, confirmation emails, itineraries, travel agency websites, etc.) to determine package constraints associated with each transportation path (e.g., a particular flight, car ride, train ride, etc.) in a transportation route (e.g., the total travel itinerary). The transportation management application 160 can further be configured to process (e.g., via image processing or natural language processing) an individual's package(s) (and the items therein) to determine characteristics such as the total weight and size of their package(s). The transportation management application 160 can then be configured to issue recommendations based on the comparison between the individual's package(s) and their transportation plan. For example, the transportation management application 160 can be configured to recommend one or more reconfigurations within the transportation plan and/or the individual's package(s) based on the comparison.

In embodiments, the transportation management application 160 can be configured to actively track an individual's package characteristics along a transportation route. That is, based on added or removed items, the individual's package characteristics (e.g., weight and size) can be automatically updated. This can be completed to ensure that, along the transportation route, the individual maintains compliance with the relevant transportation restrictions. Based on changes that occur during travel, the transportation management application 160 can be configured to issue one or more recommendations regarding the individual's package(s) and/or transportation plan.

In embodiments, the transportation management application 160 can be configured to advise an individual making purchasing decisions. For example, based on the current package characteristics, the transportation management application 160 can be configured to determine whether purchasing a particular item will maintain compliance with transportation restrictions. Additionally, the transportation management application 160 can be configured to advise the individual whether the prospective purchase will fit within their package (e.g., by comparing the product size to the amount of available space in their package). Further, the transportation management application 160 can be configured to determine whether purchasing a particular item is preemptive (e.g., earlier along the transportation route than necessary). For example, if a traveler is attempting to purchase an item that can be obtained later along the transportation route, the transportation management application 160 can be configured to advise the traveler that the item can be purchased later (e.g., at a similar price), preventing the need to travel with the item.

Though this disclosure pertains to the collection of personal data (e.g., transportation data, package data, item data, etc.), it is noted that in embodiments, users opt-in to the system (e.g., the transportation management application 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
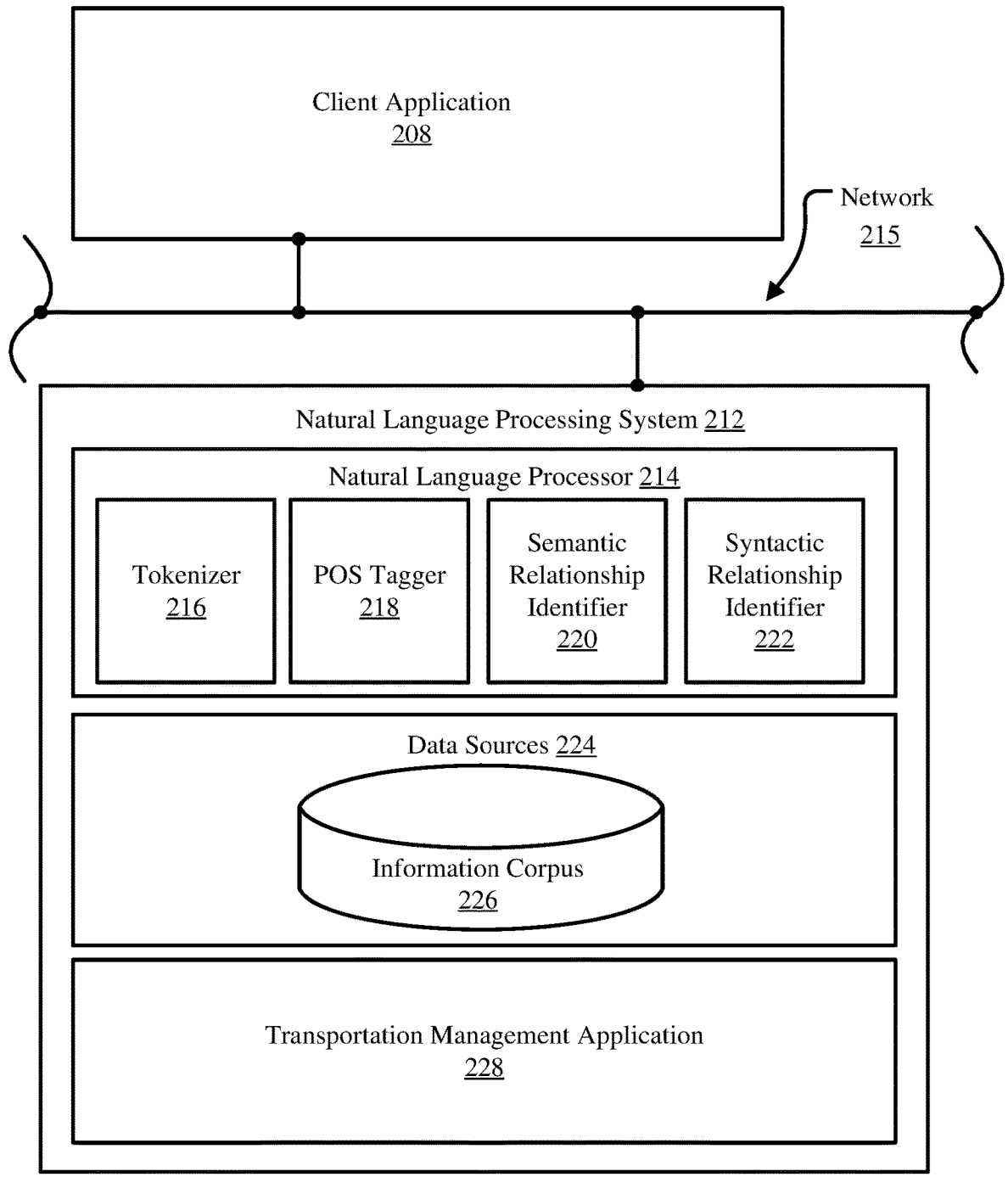
FIG. 2 is a block diagram illustrating a natural language processing system configured to process unstructured data inputs, in accordance with embodiments of the present disclosure.

Turning now to FIG. 2, illustrated is a block diagram of an example natural language processing system 212 configured to process unstructured data inputs (e.g., unstructured text documents), in accordance with embodiments of the present disclosure. In some embodiments, a remote device (e.g., device 105-1 of FIG. 1) can submit input data to be analyzed by the natural language processing system 212, which can be a standalone device, or part of a larger computer system (e.g., transportation management application 160 of FIG. 1). The natural language processing system 212 can include a client application 208, which can itself involve one or more entities operable to generate or modify unstructured input data that is then dispatched to the natural language processing system 212 via a network 215.

Consistent with various embodiments, the natural language processing system 212 can respond to electronic document submissions sent by a client application 208. Specifically, the natural language processing system 212 can analyze a received unstructured data input (e.g., an item tag, a travel ticket, a package specification indicating dimensions, an itinerary, a receipt, a web page, a confirmation email, text derived from an image, etc.) such that the unstructured data input can be considered when issuing transportation recommendations (e.g., by the transportation management application 160).

The natural language processor 214 can be a computer module that analyzes the received unstructured input data from data sources 224 (e.g., web servers, client devices, storage area networks, etc.). In some embodiments, the data sources 224 can include an information corpus 226. The information corpus 226 can enable data storage and retrieval. In some embodiments, the information corpus 226 may be a storage mechanism that houses a standardized, consistent, clean, and integrated list of data that has been arranged subject to data quality or data hygiene systems or rules.

The natural language processor 214 can perform various methods and techniques for analyzing electronic documents (e.g., syntactic analysis, semantic analysis, etc.). The natural language processor 214 can be configured to recognize and analyze any number of natural languages. In some embodiments, the natural language processor 214 can parse passages of the documents. Further, the natural language processor 214 can include various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can read a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing system 212 can populate a text index, a triple store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can be a computer module that can parse a document and generate corresponding data structures for one or more portions of the document. For example, in response to receiving an unstructured textual report at the natural language processing system 212, the natural language processor 214 can output parsed text elements from the report as data structures. In some embodiments, a parsed text element can be represented in the form of a parse tree or other graph structure. To generate the parsed text element, the natural language processor 214 can trigger computer modules 216-222.

In embodiments, the output of natural language processor 214 can be used by a transportation management application 228 (e.g., transportation management application 160 of FIG. 1). By converting unstructured transportation information (e.g., transport tickets, confirmation emails, transport receipts, etc.) into a structured format, the transportation management application 228 can generate a transportation plan. The transportation plan can include travel nodes (e.g., endpoint destinations, layover locations, etc.), transportation modes (e.g., peer-to-peer rides, flights, buses, boat rides, etc.) between travel nodes, and package restrictions associated with each transportation path.

The output of the natural language processor 214 can also be used by the transportation management application 228 to characterize an individual's packages and items. For example, the natural language processor 214 can convert unstructured item information (e.g., item tags, serial numbers, online product descriptions, etc.) and package information (e.g., online package specifications, package tags, etc.) into a structured format such that the transport management application 228 can determine the weight and/or size of various items and packages (e.g., by parsing the item/package information to identify the product specifications). The transportation management application 228 can then compare the weight and/or size of the individual's package(s) to the transportation plan indicating transportation constraints to determine whether any conflicts exist (e.g., to be discussed with reference to FIG. 4).

In embodiments, the output of the natural language processor 214 can also be used by the transportation management application 228 to aid in issuing purchasing recommendations. For example, the natural language processor 214 can be configured to convert unstructured product information into a structured format such that the product information can be used when issuing recommendations (e.g., a recommendation to purchase an item at a later time within the travel route based on availability in a later travel node).

Figure 3:
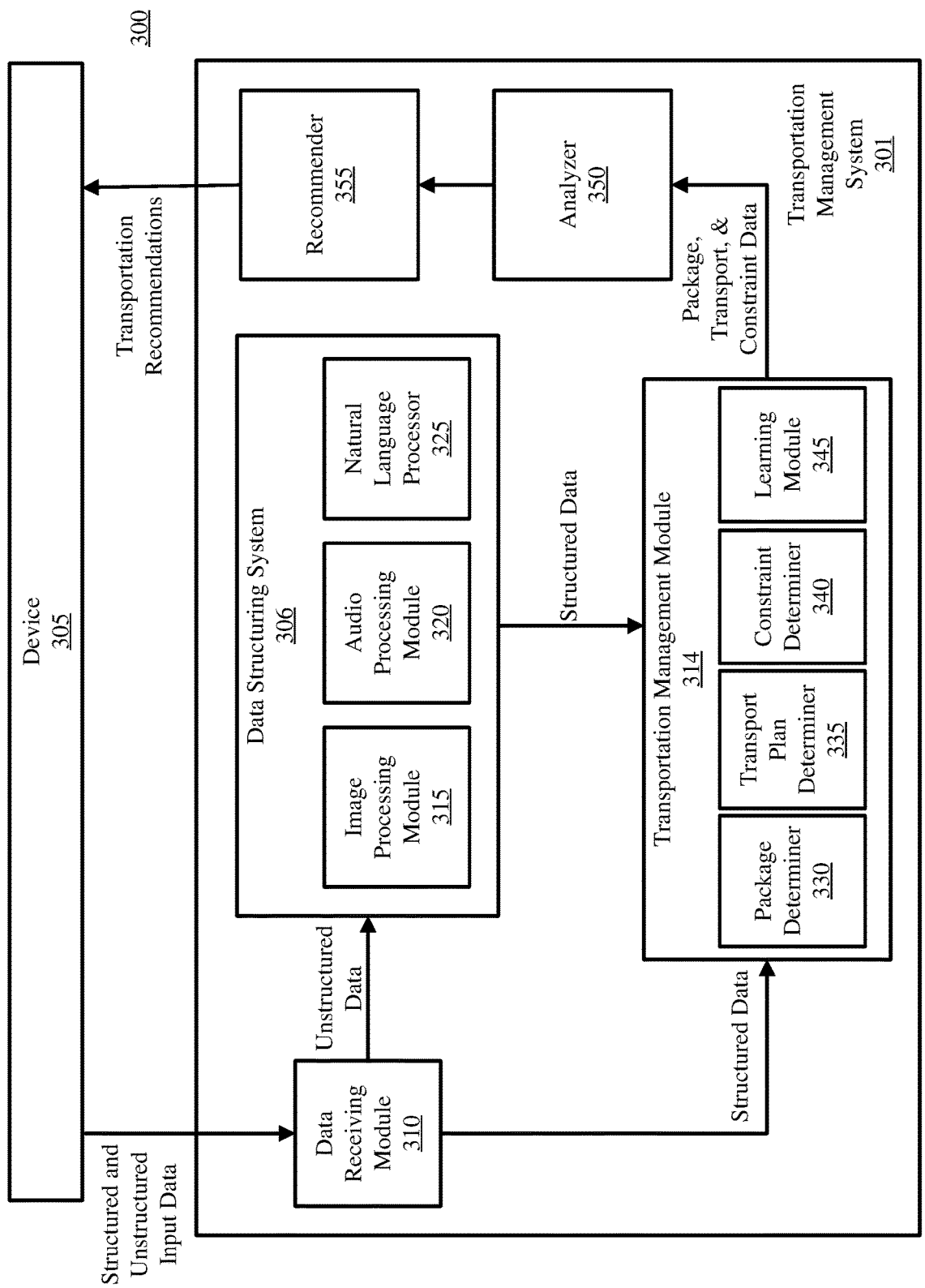
FIG. 3 is a block diagram illustrating an example computing environment including a transportation management system, in accordance with embodiments of the present disclosure.

FIG. 3 is a block diagram illustrating an example computing environment 300 in which illustrative embodiments of the present disclosure can be implemented. The computing environment 300 includes a device 305 and a transportation management system 301. The transportation management system 301 includes a data receiving module 310, a data structuring system 306, a transportation management module 314, an analyzer 350, and a recommender 355. In embodiments, the data receiving module 310, data structuring system 306, transportation management module 314, analyzer 350, and recommender 355 can be processor executable instructions that can be executed by a dedicated or shared processor using received inputs (e.g., from device 305).

Consistent with various embodiments, the data receiving module 310 can be configured to receive input data from the device 305. The device 305 (e.g., devices 105 of FIG. 1) can transmit various structured and unstructured data (e.g., images, electronic documents, videos, audio records, websites, etc.) to the data receiving module 310. In some embodiments, the structured and unstructured data can be received from a plurality of devices (e.g., in a distributed computing environment). The input data can be transmitted to the data receiving module 310 in any manner. For example, in some embodiments, input data is transmitted over a network (e.g., network 150 of FIG. 1 or network 215 of FIG. 2). The data can be received as pushed by the device 305, or alternatively, as pulled by the data receiving module 310.

After the input data is received, it can be organized into a structured data portion and an unstructured data portion. The data receiving module 310 can include logic to differentiate between structured and unstructured data. For example, in some embodiments, the data receiving module 310 only transmits data of a particular format (e.g., pdf, word, html, jpeg, etc.) to the transportation management module 314. After the data is organized into an unstructured portion and a structured portion, the unstructured data portion is transmitted to the data structuring system 306, and the structured data portion is transmitted to the transportation management module 314.

The data structuring system 306 is configured to structure the unstructured data received from the data receiving module 310. The unstructured data can include images, videos, electronic text documents, audio clips, etc. An image processing module 315, audio processing module 320, and natural language processor 325 (e.g., natural language processor 214 of FIG. 2) are configured to structure the data.

In embodiments, the image processing module 315 is configured to perform image recognition using machine learning techniques (e.g., deep learning, supervised learning, unsupervised learning, clustering, regression analysis, sequence labeling, etc.). The output of the image processing module 315 can include a classification of one or more objects within an image with corresponding match certainties. An example image recognition tool is IBM Watson™ Visual Recognition. In embodiments, the output of the image processing module 315 can be used to reference online databases for matching items, to enable characterization of items (e.g., by locating a product specification describing the product to ascertain a size and/or weight of the product). In some embodiments, the image processing module 315 can be configured to extract text from images (e.g., extract a particular product name from text on a product). This can also be used to find matching items online, enabling item characterization.

The audio processing module 320 can be configured to generate text from audio inputs. For example, for a given audio clip, the audio processing module 320 can be configured to detect speech and convert the speech into text. An example of an audio processing tool is IBM Watson™ Speech to Text.

In some embodiments, the image processing module 315 and audio processing module 320 are configured to cooperatively process video inputs. For example, the audio processing module 320 can be configured to process audio from the video input, while the image processing module 315 can be configured to process frames of the video input.

The natural language processor 325 receives unstructured textual input data (e.g., directly from data receiving module 310, or from processing modules 315 and/or 320) and structures the textual input data. In some embodiments, the textual input data is structured into a format readable by the transportation management module 314. For example, the natural language processor 325 can be configured to generate a transportation plan using unstructured text documents (e.g., travel tickets, receipts, confirmation emails, vouchers, etc.). The transportation plan can be a table (e.g., or other data structure) including various transportation nodes, transportation paths, and constraints associated with each travel path. Similarly, the natural language processor 325 can be configured to structure unstructured item and/or package data. This can be used by the transportation management module 314 when characterizing a package and the items stored therein to determine whether any conflicts exist between the package characteristics and the travel plan. The natural language processor 325 can be configured to perform one or more of the natural language processing techniques described in FIG. 2. An example of a natural language processing tool is IBM Watson™ Natural Language Understanding.

The transportation management module 314 receives structured data from the data receiving module 310 and/or data structuring system 306. The transportation management module 314 includes a package determiner 330, a transport plan determiner 335, a constraint determiner 340, and a learning module 345. In embodiments, the package determiner 330, transport plan determiner 335, constraint determiner 340, and learning module 345 can be processor executable instructions that can be executed by a dedicated or shared processor using received inputs (e.g., from device 305).

The package determiner 330 can be configured to determine characteristics (e.g., the size and weight) of an individual's package(s) and the items therein (collectively "package characteristics"). These characteristics can be used to determine the available remaining space in an individual's package, to aid the individual in properly loading the package. Further, these characteristics can be referenced against transportation constraints to ensure the individual is complying with relevant transportation restrictions. In some embodiments, the package determiner 330 can be configured to analyze items an individual is considering adding to their package (e.g., a purchase while traveling such as a souvenir). In these embodiments, the package determiner 330 can be configured to determine whether there is space in the individual's package for the prospective item, whether bringing the item will maintain compliance with travel restrictions, and whether purchasing a particular item is preemptive (e.g., earlier than necessary along the travel route).

The package determiner 330 can determine package and/or item characteristics in any suitable manner. In some embodiments, the package determiner 330 determines an identity (e.g., a product identifier, serial number, model number, etc.) of a product (e.g., a particular package or item to be stored) and references an online database (e.g., a manufacturer website and/or market place) to determine the characteristics of the product, for example, by referencing a specification indicating the dimensions and size of the product.

The identity of products can be determined with the aid of image recognition (e.g., completed by the image processing module 315), audio processing (e.g., completed by the audio processing module 320), and/or natural language processing (e.g., completed by the natural language processor 325).

To identify a product using image recognition, an individual may snap a picture of a product (e.g., a package such as a suitcase or an item such as a t-shirt) to be characterized. The image of the product may be transmitted to the data receiving module 310 from the individual's device (e.g., device 305). The image can then be analyzed by the image processing module 315 to determine the product identity. This can include using image recognition (e.g., machine learning) to find a matching item in an online database. In some embodiments, a bar code, product name, or other identifier captured in an image can be analyzed by the image processing module 315 to determine a matching product online. Once the product is identified, the package determiner 330 can locate a product specification describing the weight and size of the product can be acquired (e.g., from a manufacturer or marketplace in which the matching product was discovered).

The identity of a product can also be determined via audio recognition. In these embodiments, an individual (e.g., or entity such as a voice command device (VCD)) may utter a product name, serial number, or other product identifier into a microphone of their device (e.g., device 305). The data receiving module 310 can then receive the speech, and the speech can be converted to a structured text format by the audio processing module 320. The text identifying the product can then be referenced against an online database to determine the characteristics of the product by the package determiner 330.

In embodiments, the identity of a product can be determined via natural language processing. For example, a user may submit an unstructured electronic document (e.g., from device 305) containing a list of various items they intend on bringing (e.g., a model name of a blow dryer, a hair straightener, a cosmetic set, a tube of tooth paste, an article of clothing, etc.) as well as a package name (e.g., a suitcase model) they intend on housing the items within to the data receiving module 310. The natural language processor 325 can then be configured to analyze this electronic document such that the package determiner 330 can locate corresponding product specifications for the various items and packages. For example, the natural language processor 325 can output a set of keywords corresponding to the product names of each of the products on the list.

In some embodiments, the package determiner 330 can be configured to determine item and/or package characteristics solely based on an image analysis. For example, a user may snap one or more images of a particular item or package they intend on traveling with. The image processing module 315 can then be configured to approximate the product material (e.g., a metal, cloth, plastic, etc.) or classification (e.g., a blow dryer, a t-shirt, a pair of shoes) using image recognition techniques (e.g., IBM Watson™ Image Recognition). In embodiments, the image processing module 315 can be configured to approximate dimensions of the product using photogrammetry techniques. The material or classification of the product (e.g., indicating the product density) as well as the product dimensions can be collectively considered to approximate the weight of the product.

In some embodiments, multiple items and/or products can be identified and/or characterized in a single image. For example, an image containing two or more items and/or packages an individual intends on traveling with can be simultaneously analyzed by the image processing module 315 using image recognition techniques (e.g., deep learning, clustering, supervised machine learning, unsupervised machine learning, etc.).

Ultimately, the output of the package determiner 330 can include the total weight of items to be housed within one or more packages, dimensions (e.g., the height, length, and width) of each item, package(s) in which the items will be housed, the weight of each package, the available space within each package, the number of packages, and the dimensions of each package. In some embodiments, the package determiner 330 can output the size and weight of a prospective purchases. In some embodiments, the package determiner 330 can output the size and weight of an item to be added to a package along a travel route. This data can then be used by the transportation management system 301 when issuing recommendations.

The transport plan determiner 335 is configured to generate a transportation plan (e.g., a structured itinerary) based on an individual's travel information. Structured input data describing an individual's transportation route (e.g., images of flight tickets, electronic confirmation emails, web data from transportation agencies, etc.) received from the data structuring system 306 and/or data receiving module 310 can be organized into a transportation plan. The transportation plan can include the various transportation nodes within the transportation route (e.g., a starting point, layover locations, and one or more destinations), the transportation modes in between the transportation nodes (e.g., including the model of the vehicle and transportation facilitator for each travel path), and the time and date of arrival at each travel node.

Table 1 depicts an exemplary transport plan starting from the transport node "Chicago" and ending at the transport node "Maui."

TABLE 1

| Transport Node | Transport Mode (Departure) | Transport Mode (Arrival) | Transport Model (Depart) | Transport Agency |
|---|---|---|---|---|
| Chicago | Drive | N/A | Model A Van | Personal |
| Denver | Flight | Drive | Model B Airplane | Airline A |
| Los Angeles | Flight | Flight | Model C Airplane | Airline B |
| Honolulu | Ferry | Flight | Model D Ferry | Marine Service A |
| Maui | N/A | Ferry | N/A | N/A |

The transport plan depicted in Table 1 includes various transport nodes starting from "Chicago" and ending at "Maui." The transportation modes for departure and arrival between each node are depicted in the $2^{nd}$ and $3^{rd}$ columns, respectively. Further, the corresponding transport model (e.g., vehicle) and transport agency (e.g., airline, rental service, marine service, etc.) are depicted in the $4^{th}$ and $5^{th}$ columns, respectively.

In embodiments, the transport plan is automatically populated based on various input data received from a user. For example, the user may submit various structured and/or unstructured input data such as images (e.g., of flight tickets, paper receipts, brochures, etc.), text documents (e.g., airline itineraries, confirmation emails, electronic receipts, etc.), and/or audio/video (AV) recordings (e.g., utterance of a proposed travel route by a user, a document read aloud by a voice command device (VCD), etc.). The data receiving module 310 can be configured to forward any of the structured data (e.g., data already organized into a transport plan) directly to the transport plan determiner 335. The data receiving module 310 can further forward any unstructured data to the data structuring system 306 for processing. The data structuring system 306 can then process the unstructured data such that the transport plan can be generated based on the input data.

As an example, images of tickets for each transport path (e.g., an image of the flight ticket from Denver to LA, an image of the flight ticket from LA to Honolulu, and an image of the ferry ticket from Honolulu to Maui) can be received by the data receiving module 310 and transmitted to the image processing module 315 of the data structuring system 306. The image processing module 315 can then be configured to extract text from each of the tickets indicating the transport agency, transport vehicle model, departure destination, and arrival destination associated with each travel path. This information can then be used to populate the transport plan depicted in Table 1. It is noted that Table 1 is merely exemplary, and the contents of a transport plan can vary. The transport plan can have more or less information than depicted in Table 1. Further, the transport plan can be generated using any other suitable information (e.g., a confirmation email vs. a flight ticket) or processing techniques (e.g., natural language processing vs. image processing).

The constraint determiner 340 can be configured to determine various restrictions associated with transport paths in between transport nodes. For example, the constraint determiner 340 can be configured to reference travel agency data, vehicle model specifications, and the like to determine restrictions associated with each travel path.

Table 2 depicts an exemplary constraint table corresponding to the transport plan of Table 1.

TABLE 2

| Transport Node | Checked Weight Restriction | Checked Linear Size Restriction | Allowed Carry-Ons | Carry-On Size Restriction | Carry-On Weight Restriction |
|---|---|---|---|---|---|
| Chicago | N/A | N/A | N/A | 100 in | 200 lb |
| Denver | 40 lb | 50 in | 1 | 40 in | 20 lb |
| Los Angeles | 50 lb | 62 in | 2 | 50 in | 32 lb |
| Honolulu | N/A | N/A | 2 | 62 in | None |

As depicted in Table 2, the various constraints associated with each transport path (e.g., from Chicago to Denver, from Denver to LA, from LA to Honolulu, and from Honolulu to Maui) are shown. These restrictions correspond to the departure from each node. Thus, the Denver transport node row depicts the transport restrictions associated with the flight from Denver to LA, the LA transport node row depicts the transport restrictions associated with the flight from LA to Honolulu, etc. The checked weight restrictions, checked linear size restrictions (e.g., the added height, length, and width), allowed carry-ons, carry-on size restrictions, and carry-on weight restrictions are quantified in Table 2. In embodiments, checked weight restrictions only apply to flight transport. Accordingly, carry-on size/weight restrictions can cover weight and size restrictions for other transportation routes (e.g., peer-to-peer ride sharing, marine transport, taxis, rental services, etc.).

The constraint determiner 340 can determine constraints associated with transport paths using various input data. For example, the user may submit various structured and/or unstructured input data such as images (e.g., of flight tickets, paper receipts, brochures, etc.), text documents (e.g., airline itineraries, confirmation emails, electronic receipts, etc.), and/or audio/video (AV) recordings (e.g., utterance of an airline and/or vehicle model by a user). The data receiving module 310 can be configured to forward any of the structured data (e.g., data already organized into a constraint table) directly to the constraint determiner 340. The data receiving module 310 can further forward any unstructured data to the data structuring system 306 for processing. The data structuring system 306 can then process the unstructured data such that the constraint table can be generated based on the input data.

The source(s) the constraints are derived from can vary. For example, constraints can be determined from websites (e.g., travel agency websites), vehicle specifications (e.g., electronic or physical manuals), or any other source indicating size/weight restrictions associated with particular vehicle models and/or agencies. In some embodiments, constraints can be manually defined by a user.

For example, to identify the constraints associated with the transport path from Chicago to Denver, an individual may submit an electronic vehicle specification (e.g., manual) associated with the van the user plans on driving to Denver. The specification can be structured by the natural language processor 325, and the constraint determiner 340 can be configured to determine an amount of available space (e.g., in the trunk of the van) and recommended load from the van specification. The constraints can then be added to the constraint table depicted in Table 2 (e.g., 100 inches and 200 lb). As another example, to identify constraints associated with the transport path from Denver to LA, a user may snap an image of their flight ticket, which may be received by the image processing module 315. The image processing module can be configured to extract text regarding the airline (Airline A) and the vehicle model (Model B Airplane). The constraint determiner 340 can then use this information to search online for relevant restrictions associated with Airline A and the vehicle Model B Airplane. The constraint table depicted in Table 2 can then be modified to include these constraints.

It is noted that the constraint table depicted in Table 2 is merely exemplary. A constraint table can contain greater or fewer constraints associated with each transport path. For example, restrictions on specific items and/or pets can be included in a constraint table. In some embodiments, the constraint table depicted in Table 2 is merged with the transport plan depicted in Table 1 (e.g., the transport plan includes constraints associated with each transport path).

The learning module 345 can be configured to receive user feedback regarding determinations made by the package determiner 330, transport plan determiner 335, and constraint determiner 340. This feedback can be used to improve the characterization of package(s) and items, the generation of the transport plan, and the determination of the constraints. For example, the learning module 345 can issue positive or negative feedback (e.g., reinforcement learning) to the package determiner 330, transport plan determiner 335, and/or constraint determiner 340 based on a comparison between the determinations and observed results.

In embodiments, the learning module 345 can be configured to improve size/weight predictions made by the package determiner 330. For example, assume the total weight of a package (including the items stored therein) was determined to be 35 lbs. The learning module 345 can then be configured to receive a user measurement (e.g., a scale measurement) of the package including the items. Based on the difference between the estimation and the actual measurement, a feedback signal can be provided to the package determiner 330. For example, if the prediction was incorrect by a particular margin (e.g., 10 lbs), negative feedback could be issued to the package determiner 330. In contrast, if the prediction was within a particular margin, positive reinforcement could be issued to the package determiner 330. This feedback can be used to improve the accuracy of the package determiner 330 over time. The feedback (e.g., whether the feedback is positive or negative, the magnitude of the feedback, etc.) issued by the learning module 345 can depend on the difference between approximated package characteristics and the observed (e.g., measured) package characteristics.

Similarly, the learning module 345 can be configured to improve constraint determination and/or transport plan generation. For example, based on the difference between the approximated transport plan and/or constraints (e.g., determined by the transport plan determiner 335 and constraint determiner 340, respectively) and an expected transport plan and/or constraints (e.g., manually defined by a user), feedback can be issued by the learning module to improve prediction accuracy.

The analyzer 350 is configured to analyze the data received from the transportation management module 314. The output of the analyzer 350 can include one or more recommendations to be issued by the recommender 355.

In embodiments, the analyzer 350 can be configured to compare the package characteristic data (e.g., determined by package determiner 330) to the transport plan constraints (e.g., determined by the constraint determiner 340) to determine whether the transport restrictions are satisfied. If a determination is made that the package characteristics do not satisfy (e.g., exceed) any transport plan constraints, then the analyzer 350 can be configured to prompt the recommender 355 to recommend the individual to make one or more reconfigurations to their package(s) and/or transport plan.

For example, if the package characteristic data indicates that an individual has a single package weighing 60 lbs, and the travel plan constraints indicate that the maximum weight of packages on the flight is 50 lbs, then the analyzer 350 can determine that the package characteristics exceed the flight weight limit. The analyzer 350 can then be configured to determine an alternate solution which satisfies the transport restrictions. In some embodiments, this can include recommending one or more items to be removed from the package. In some embodiments, this this can include recommending an alteration to the transport plan. For example, the analyzer 350 can be configured to recommend a different flight, an upgraded service (e.g., an additional bag checked such that weight can be removed from the 60 lb bag), or a different flight agency.

In some embodiments, the analyzer 350 can be configured to determine whether items an individual plans on transporting will fit within a particular package or set of packages. For example, based on the determined package characteristics, a total item volume (e.g., the volume that the collective items will require) can be compared to a total package volume (e.g., the available space among all packages). If the total item volume exceeds the total package volume, a determination can be made that the items will not fit within the available package space. The analyzer 350 can then prompt the recommender 355 to issue one or more package reconfigurations and/or item suggestions. For example, the recommender 355 can recommend that the individual should remove one or more items (e.g., such that the total item volume falls within the available space), that the individual should upgrade to a bigger package, or that the individual should intend on bringing an additional package.

In some embodiments, the analyzer 350 can be configured to determine whether one or more new (e.g., recently purchased) items will fit within the available package space and/or maintain compliance with relevant restrictions. For example, the new item to be added can be characterized (e.g., the weight and size can be determined) by the package determiner 330. Based on the characteristics of the new item, the analyzer 350 can determine whether the new item will fit within the individual's package(s). Further, the analyzer 350 can be configured to determine whether adding this new item will maintain compliance with the relevant travel restrictions.

In some embodiments, the analyzer 350 can be configured to determine whether a particular purchase is preemptive. For example, a prospective purchase can be identified (e.g., a product name can be determined, a product number can be identified, etc.) by the package determiner 330. Based on the identification of the product, the analyzer 350 can be configured to reference the transport plan to determine whether the prospective purchase is available in any downstream transport nodes (e.g., destinations later along the transport route). In embodiments, the analyzer 350 can browse online stores to determine whether the prospective purchase is available at any of the downstream transport nodes. If the analyzer 350 determines that the prospective purchase is available later along the transport route, then the analyzer 350 can prompt the recommender 355 to issue a recommendation to buy the prospective purchase at the later transport node where the product was identified.

The recommendations issued by the recommender 355 can be received by the device 305. These recommendations provide several advantages for a traveling individual. For example, the individual can be alerted if their package(s) exceed any constraints indicated along their transport route. Further, as the individual is adding and/or removing items while traveling, they can be continually updated regarding whether their new package characteristics satisfy the constraints along the remaining paths of the transport route. These recommendations can further aid the user in loading their packages (e.g., by comparing current item volume to available package space). Additionally, these recommendations can be used to a guide a user when making a prospective purchase. Collectively, these advantages result in improved usability for the individual at least insofar as the specific recommendations provided by the recommender 355 can provide the individual with particular guidance for satisfying a variety of requirements related to various packaging constraints.

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary.

Figure 4:
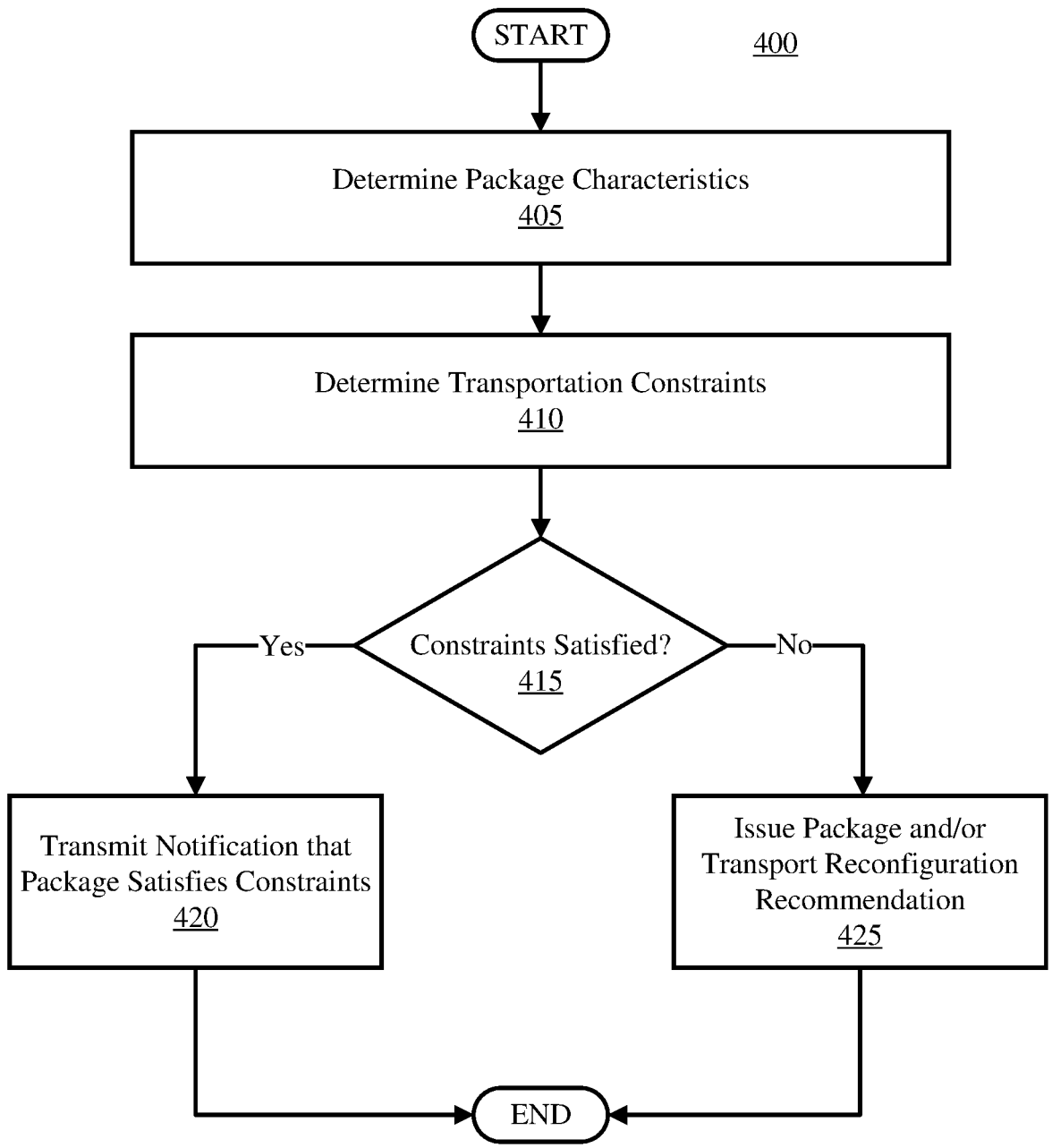
FIG. 4 is a flow-diagram illustrating an example method for determining whether package characteristics satisfy transportation constraints, in accordance with embodiments of the present disclosure.

FIG. 4 is a flow-diagram illustrating an example method 400 for determining whether package characteristics satisfy transportation constraints, in accordance with embodiments of the present disclosure.

Method 400 initiates at operation 405, where package characteristics are determined. The package characteristics can include the number of packages, the total volume within each package, the weight of each package, the size (e.g., linear dimensions) of each package, the number of items to be packaged, the volume of items to be packaged, and the weight of items to be packaged. In some embodiments, the package characteristics include the available volume within each package based on a packed configuration (e.g., one or more items stored within a package) of each package.

Package characteristics can be determined in any suitable manner. In embodiments, the package characteristics can be determined by identifying items and/or packages to be transported (e.g., via image processing, audio processing, and/or natural language processing techniques described in FIG. 3) and locating a matching item and/or package online. A product specification describing the matching item and/or package can then be used to determine the characteristics of each item and/or package. In some embodiments however, the characteristics of items and/or packages can be determined using image recognition techniques. For example, package and/or item dimensions can be approximated using photogrammetry techniques.

Transportation constraints are then determined. This is illustrated at operation 410. Transportation constraints can be determined in any suitable manner. In some embodiments, unstructured input data describing the transportation route (e.g., images of transportation tickets, a confirmation email, a receipt, etc.) can be received and a transportation agency or vehicle model can be determined based on the input data (e.g., via the image processing, audio processing and/or natural language processing techniques described in FIG. 3). Information regarding the transport restrictions associated with the transportation agency and/or vehicle model can then be determined by referencing additional information such as a transportation agency website (e.g., an online rule listing) or a vehicle specification or manual.

The transportation constraints can include the number of allowed packages, permitted package weight, permitted package size (e.g., linear dimensions), carry-on restrictions (e.g., number, size, or weight), checked package restrictions (e.g., number, size, or weight), restricted items (e.g., sharp objects), limitations on items (e.g., permitted liquid volume), etc. In embodiments, transportation constraints are collected for each transportation path within a transportation route.

A determination is made whether the package characteristics satisfy the transportation constraints. This is illustrated at operation 415. The package characteristics (e.g., the size, weight, and number of packages) are compared to the transportation constraints (e.g., the permitted size, weight, and number of packages). For example, if a particular transportation path (e.g., a flight) has a 50 lb package weight restriction, a 62 inch package size restriction, and a two package limit, then the transportation restrictions for that particular transportation path would only be satisfied if the package characteristics were within 50 lbs, 62 inches, and two packages.

If a determination is made that the package characteristics satisfy the transportation constraints, then a notification can be transmitted that the package characteristics satisfy the transportation constraints. This is illustrated at operation 420. This can be completed to inform an individual that their package(s) comply with relevant transport restrictions along their transportation route.

If a determination is made that the package characteristics do not satisfy the transport constraints, then a package and/or transport reconfiguration recommendation is issued. This is illustrated at operation 425. The reconfiguration recommendation can be directed to: adding and/or removing a particular item (e.g., to comply with weight restrictions), downgrading package size (e.g., to comply with size restrictions), redistributing items among packages (e.g., moving items from a package which breached a weight limit to another package), modifying a transportation plan (e.g., upgrading to a bigger vehicle or swapping to a different transportation agency), etc.

In embodiments, the reconfiguration recommendation can depend on one or more breached transportation constraints. For example, if a transportation item restriction on a particular item (e.g., a pair of scissors) is breached, then the reconfiguration recommendation can include a recommendation that the individual should remove the prohibited item from their package. As another example, if a transportation constraint specifies that an individual is only allowed a single 50 lb bag, and the individual has a 55 lb bag, the recommendation can specify that the individual should remove at least 5 lbs from the bag. In some embodiments, the recommendation can specify one or more items to be removed from the bag to comply with the weight restrictions (e.g., a 7 lb hair straightener can be removed to remain within the 50 lb limit).

After a notification that the package characteristics satisfy the transportation constraints is transmitted at operation 420, or after a package and/or transport reconfiguration recommendation is issued at operation 425, method 400 ends.

The aforementioned operations can be completed in any order and are not limited to those described. Additionally, some, all, or none of the aforementioned operations can be completed, while still remaining within the spirit and scope of the present disclosure.

Figure 5:
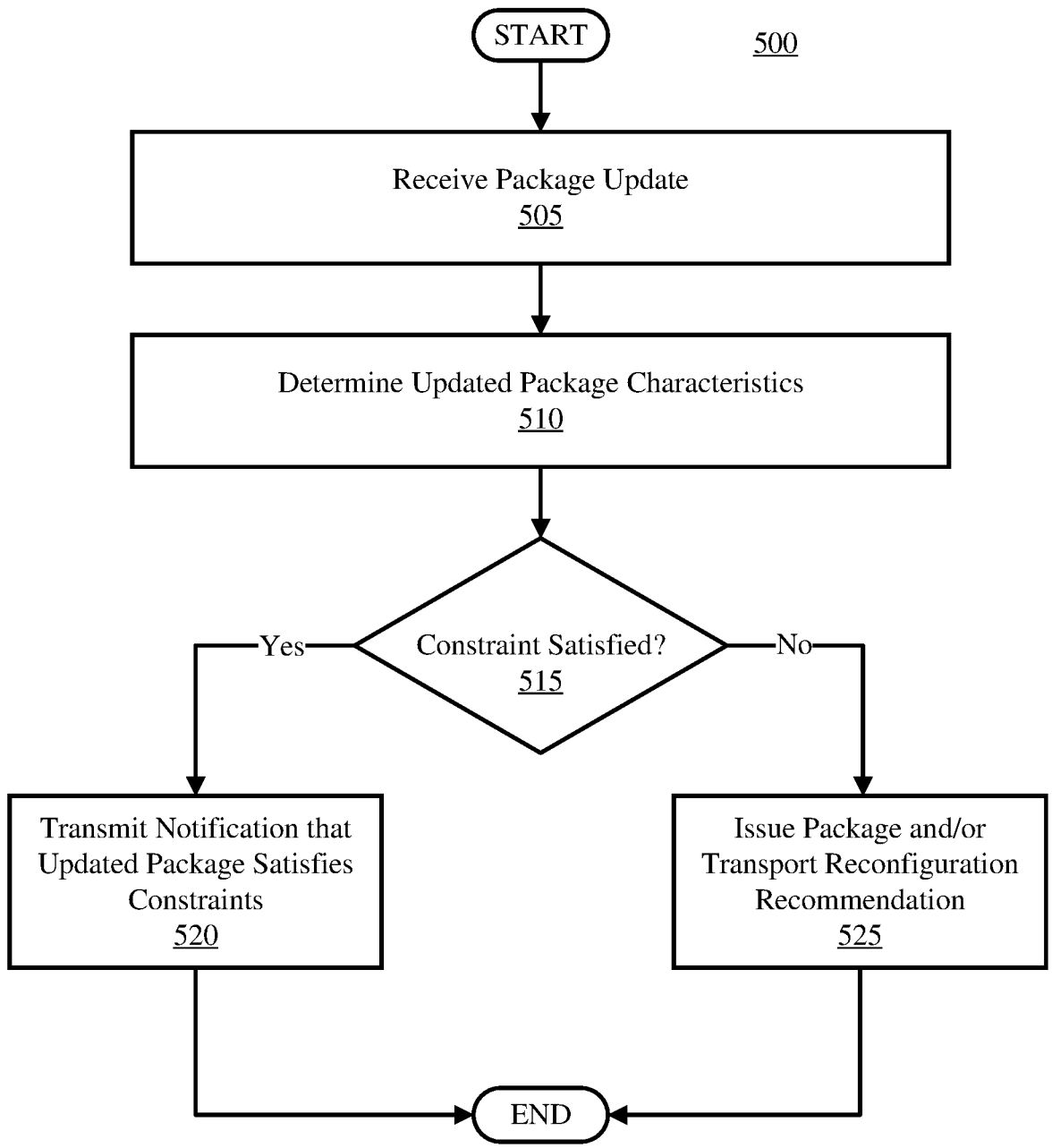
FIG. 5 is a flow-diagram illustrating an example method for determining whether updated package characteristics satisfy transportation constraints, in accordance with embodiments of the present disclosure.

FIG. 5 is a flow-diagram illustrating an example method 500 for determining whether updated package characteristics satisfy transportation constraints, in accordance with embodiments of the present disclosure.

Method 500 initiates at operation 505, where a package update is received. The package update can include one or more items to be added and/or removed from one or more packages. In some embodiments, the package update can include an additional package, removed package, or replacement package. These updates can be received along a transport route (e.g., an individual buys a new briefcase or item to bring along their travels).

Updated package characteristics are then determined. This is illustrated at operation 510. The updated package characteristics can include an updated number of packages, an updated total volume within each package, an updated weight of each package, an updated size (e.g., linear dimensions) of each package, an updated number of items to be packaged, an updated volume of items to be packaged, and/or an updated weight of items to be packaged.

The updated package characteristics can be determined in any suitable manner. In embodiments, the updated package characteristics can be determined in the same, or a substantially similar manner, to operation 405 of FIG. 4. For example, updated package characteristics can be determined by identifying updated items and/or packages and referencing a specification describing the characteristics of such items and/or packages. In some embodiments, the updated package characteristics can be determined using image recognition techniques. For example, photogrammetry techniques can be used to determine the dimensions of a newly purchased item to be transported.

A determination is made whether the updated package characteristics satisfy the transportation constraints (e.g., determined at operation 410 of FIG. 4). This is illustrated at operation 515. This can be completed in the same, or a substantially similar manner, to operation 415 of FIG. 4. For example, the updated package characteristics can be compared to the remaining transportation constraints to determine whether the updated package characteristics comply with the transportation constraints (e.g., the package is within a particular weight limit, package count, size restriction, etc.).

If a determination is made that the updated package characteristics satisfy the remaining transportation constraints, a notification is transmitted indicating that the package characteristics satisfy the transportation constraints. This is illustrated at operation 520. The notification is transmitted to alert the user that the modification they made to their package load complies with the remaining transportation constraints.

If the updated package characteristics do not satisfy the remaining transportation constraints, then a reconfiguration recommendation is issued. This is illustrated at operation 525. The reconfiguration recommendation can be completed the same as, or substantially similar to, operation 425 of FIG. 4. For example, the reconfiguration recommendation can be directed to: adding and/or removing a particular item (e.g., to comply with weight restrictions), downgrading package size (e.g., to comply with size restrictions), redistributing items among packages (e.g., moving items from a package which breached a weight limit to another package), modifying a transportation plan (e.g., upgrading to a bigger vehicle or swapping to a different transportation agency), etc.

As an example, assume an individual initially travels with a package weighing less than 50 lbs. During his travels, the individual adds 20 lbs to his package, such that the package now weighs 65 lbs. On the return flight home, the individual now exceeds a 50 lb checked-bag flight limit. The fee for checking the 65 lb bag may be $200, while the fee for checking two bags within 50 lbs may be $150. In this instance, the reconfiguration recommendation issued may include a recommendation that the individual should distribute his items between two packages to save $50.

After a notification is transmitted at operation 520, or after a reconfiguration recommendation is issued at operation 525, method 500 ends.

The aforementioned operations can be completed in any order and are not limited to those described. Additionally, some, all, or none of the aforementioned operations can be completed, while still remaining within the spirit and scope of the present disclosure.

Figure 6:
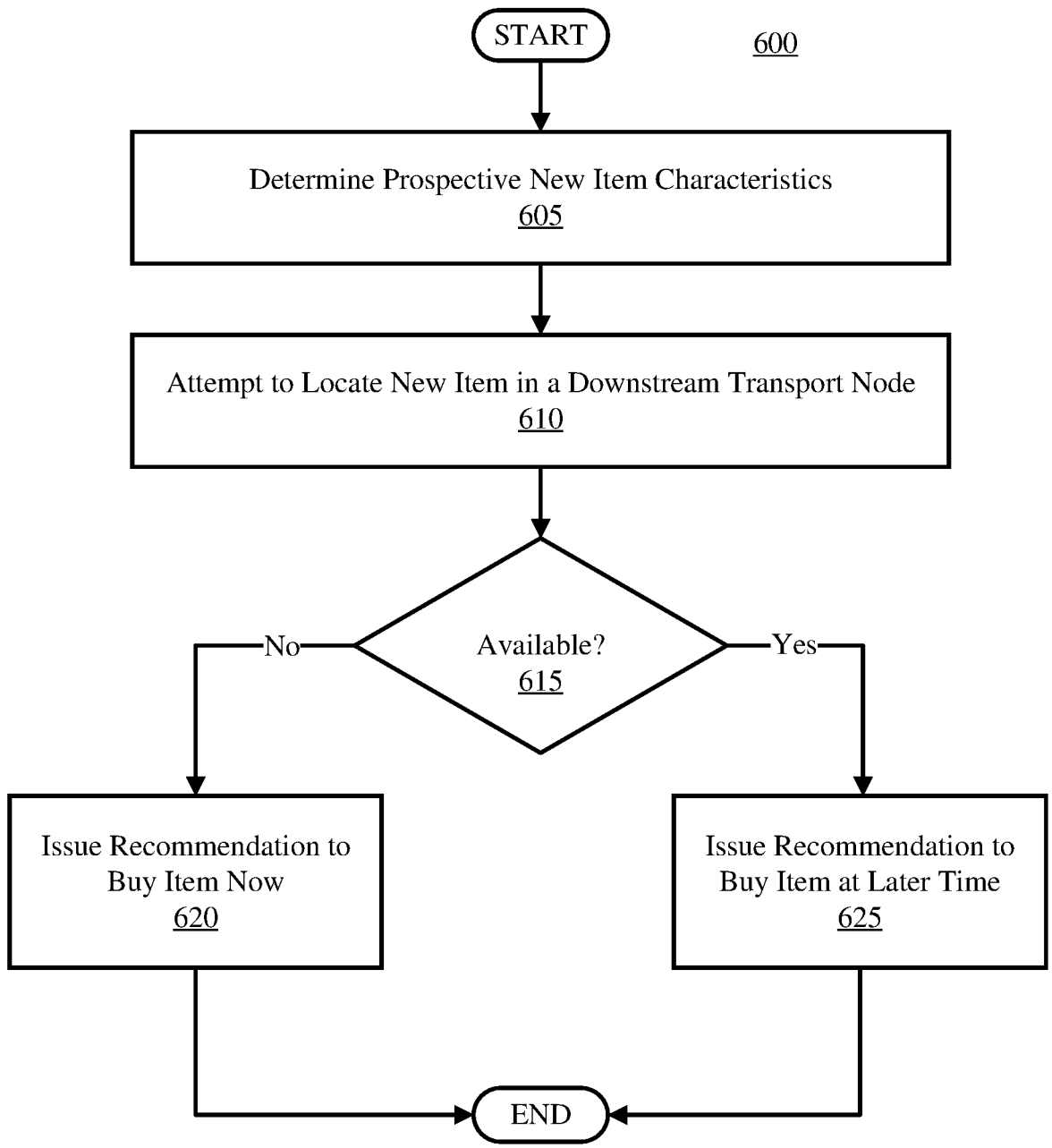
FIG. 6 is a flow-diagram for determining whether a purchase during transportation is preemptive, in accordance with embodiments of the present disclosure.

FIG. 6 is a flow-diagram illustrating an example method 600 for determining whether a purchase is preemptive, in accordance with embodiments of the present disclosure.

Method 600 initiates at operation 605, where prospective item characteristics (e.g., the weight, size, and identification of a prospective purchase) are determined. The prospective item characteristics can be determined in the same, or a substantially similar manner, to operation 405 of FIG. 4 or operation 505 of FIG. 5. For example, the item can be identified (e.g., using image processing or natural language processing), and a product specification describing the item can be located to characterize the item.

An attempt is then made to locate the item within a downstream transport node (e.g., a later destination within the transport route). This is illustrated at operation 610. Based on an identification of the prospective item (e.g., determined at operation 605), databases online can be parsed (e.g., via natural language processing) to determine whether the item is available at a downstream transport node. A determination is made whether the prospective item is available at a downstream transportation node based on the attempt. This is illustrated at operation 615. For example, assume a user is considering purchasing a box of chocolates from Spain. The box of chocolates is then identified and referenced online. Further, assume that the user will next travel to Serbia, and the same box of chocolates was located at various market places in Serbia. In this example, a determination would be made that the prospective new item is available at a downstream transportation node.

If a determination is made that the prospective new item is not available at a downstream transportation node, then a recommendation to buy the prospective new item at the current transport node is transmitted. This is illustrated at operation 620. This is completed to ensure the user does not pass up on their prospective purchase, as it may not be available later on.

If a determination is made that the prospective new item is available at a downstream transportation node, then a recommendation is made to buy the item at a downstream transportation node. This is illustrated at operation 625. Following the example above, the recommendation can indicate that the box of chocolates is available in Serbia, and that the user should not buy the box of chocolates in Italy. This is completed to deter the user from traveling with an unnecessary item, as they can purchase the item at a later destination along their travels. In some embodiments, the recommendation can be based on the price of the item between the current and downstream transportation nodes. For example, if the prospective new item is more expensive at the downstream transportation node, then the user can be recommended to buy the item at the current transportation node.

After a recommendation to buy the prospective new item at the current transportation node is transmitted at operation 620, or after a recommendation to buy the prospective new item at a downstream transportation node is transmitted at operation 625, method 600 terminates.

The aforementioned operations can be completed in any order and are not limited to those described. Additionally, some, all, or none of the aforementioned operations can be completed, while still remaining within the spirit and scope of the present disclosure.

Figure 7:
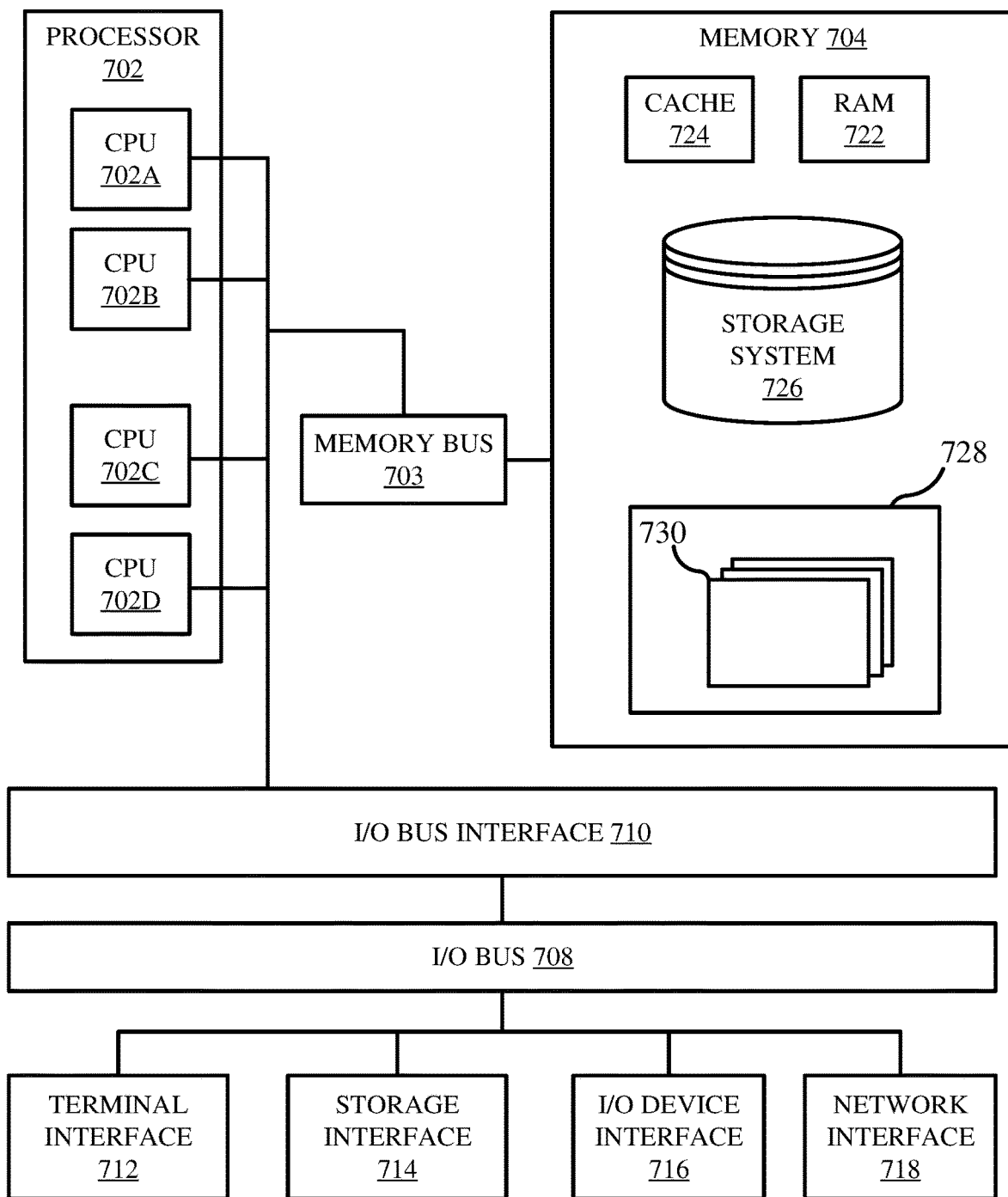
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 (e.g., devices 105, server 135, and device 305) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 728 and/or program modules 730 generally perform the functions or methodologies of various embodiments.

In some embodiments, the program modules 730 of the computer system 701 include a transportation management module. The transportation management module can be configured to determine (e.g., via image recognition or natural language processing) package characteristics of one or more packages. The transportation management module can further be configured to determine (e.g., by parsing unstructured one or more text documents via natural language processing) transportation constraints associated with one or more transportation paths within a transportation route. In embodiments, the transportation management module can be configured to compare the package characteristics to the transportation constraints to determine whether any conflicts exist (e.g., whether any transportation constraints are not satisfied). If a determination is made that any transportation constraints are not satisfied, then the transportation management module can be configured to issue one or more reconfiguration recommendations. The reconfiguration recommendations can include one or more alterations to a traveling individual's packages and/or transportation plan.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
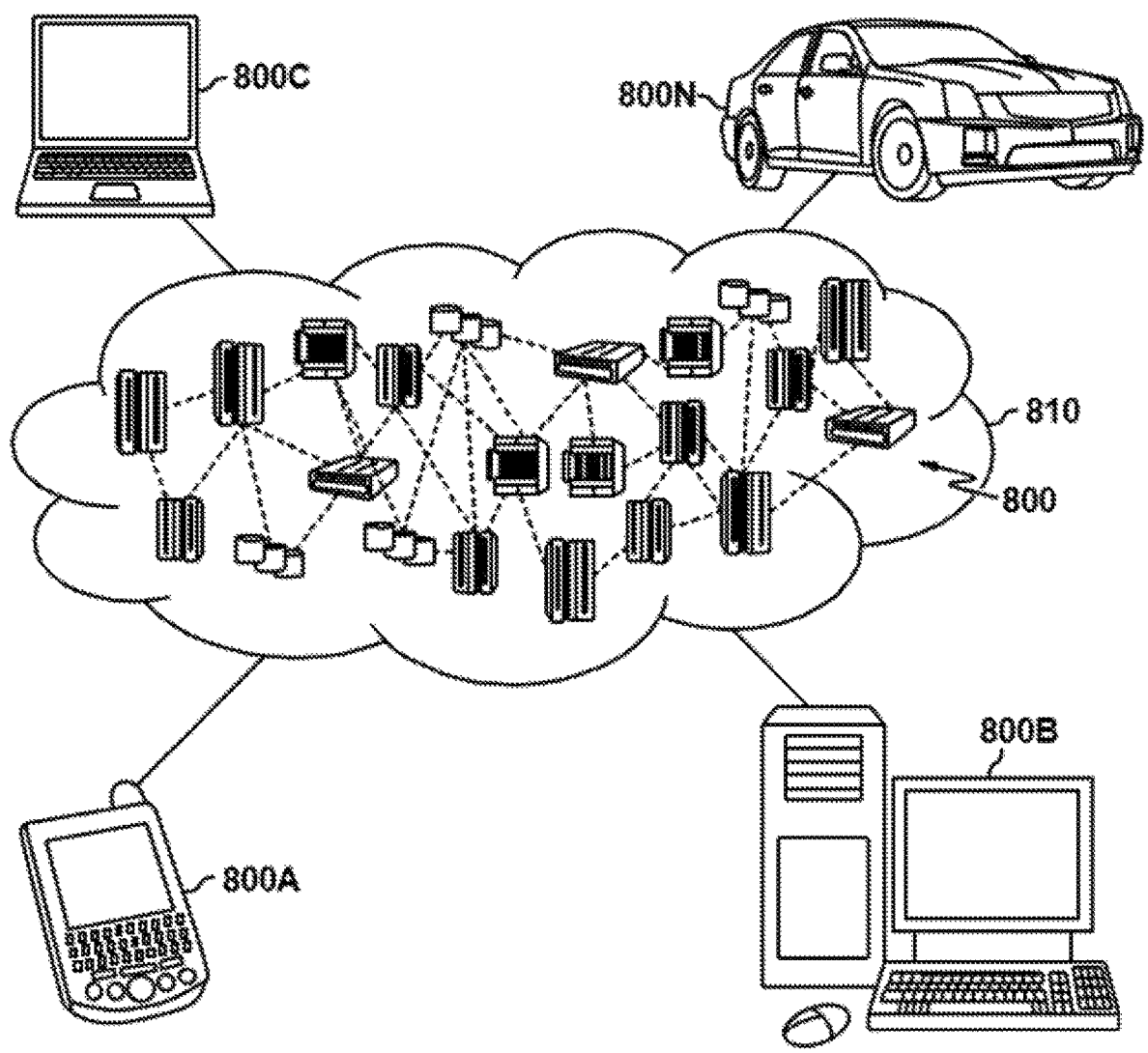
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A (e.g., devices 105 or 305), desktop computer 800B (e.g., devices 105, server 135, and device 305) laptop computer 800C (e.g., devices 105 or 305), and/or automobile computer system 800N (e.g., devices 105 or 305) can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
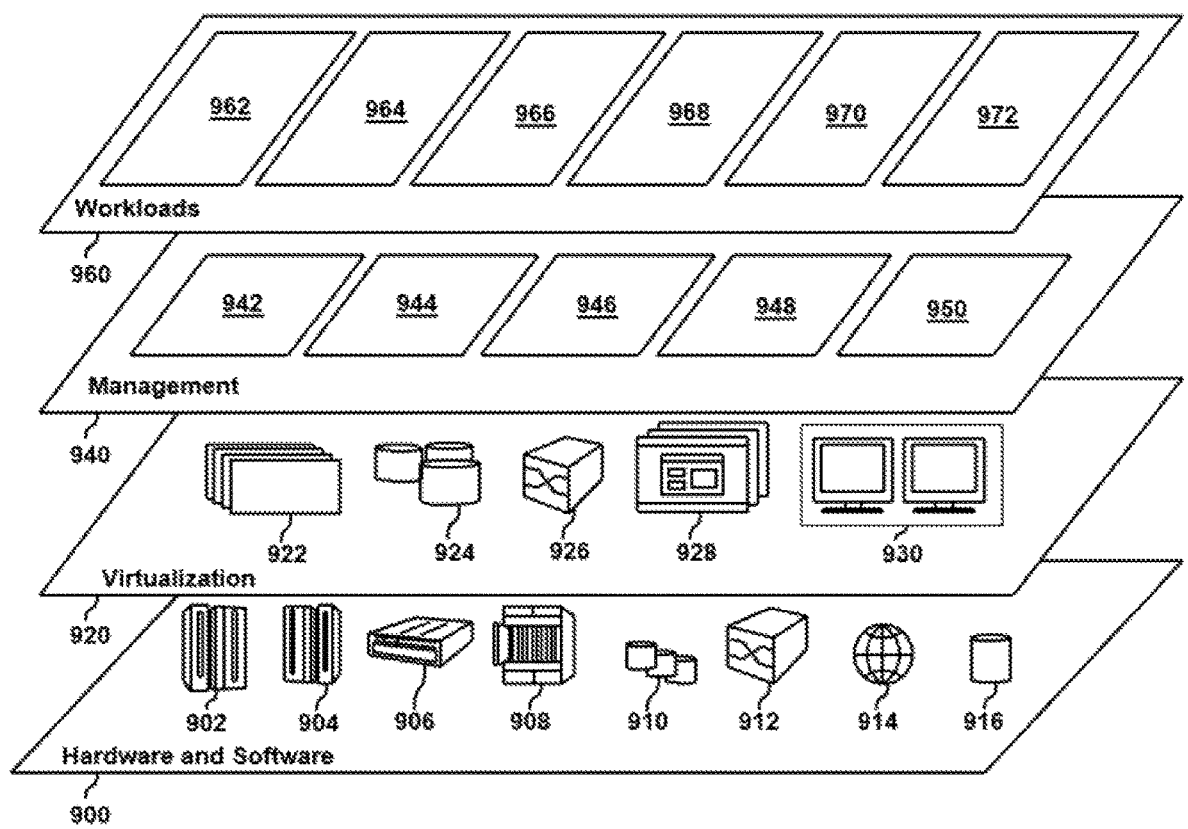
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices (e.g., devices 105, server 135, and device 305) which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; image processing 964; natural language processing 966; item transportation management 968; transaction processing 970; and data analytics processing 972.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining, using a machine learning module configured to perform photogrammetry techniques, package characteristics of a first package, wherein the package characteristics include a set of dimensions and a weight of the first package;
   processing, using a natural language processor, a set of unstructured data to determine a transportation constraint associated with a transportation path, wherein the natural language processor is configured to tokenize the set of unstructured data such that a set of dimensional constraints and a weight constraint can be ascertained from the set of unstructured data;
   comparing the set of dimensions and the weight of the first package to the set of dimensional constraints and the weight constraint of the transportation constraint;

determining, based on the comparison, that the package characteristics of the first package do not satisfy the transportation constraint;

issuing, in response to the determination that the package characteristics of the first package do not satisfy the transportation constraint, a reconfiguration recommendation to an individual associated with the first package;

requesting feedback from the individual regarding the determined weight of the first package;

receiving negative feedback from the individual based on an actual weight of the first package exceeding the determined weight by a first margin;

issuing, in response to receiving the negative feedback, negative reinforcement to the machine learning module configured to determine the package characteristics of the first package;

updating, based on the issued negative reinforcement, the machine learning module;

receiving a package update to the first package by the individual;

determining, using the updated machine learning module configured to perform photogrammetry techniques, updated package characteristics of the first package;

receiving an indication of an item to be prospectively purchased by the individual along a second transportation path;

analyzing the item using the updated machine learning module configured to perform photogrammetry techniques to determine dimensions and a weight of the item;

comparing the updated package characteristics of the first package including the item to a second transportation constraint associated with the second transportation path;

determining, based on the comparison, that the updated package characteristics of the first package including the item do not satisfy the second transportation constraint; and issuing, in response to the determination that the updated package characteristics of the first package including the item do not satisfy the second transportation constraint, a second reconfiguration recommendation to the individual associated with the first package, the second reconfiguration recommendation including a recommendation to remove the item.

2. The method of claim 1, wherein determining package characteristics of the first package includes:
identifying, by extracting text from an image, a second item;
searching for a matching item using the identification of the second item; and
referencing a specification describing the second item to ascertain a weight and a size of the second item.

3. The method of claim 1, wherein the set of unstructured data is selected from a group consisting of: transportation tickets, confirmation emails, receipts, transportation websites, and product specifications.

4. The method of claim 1, wherein the transportation constraint is a prohibited item, wherein the package characteristics of the first package indicate that the first package includes the prohibited item, wherein the reconfiguration recommendation includes a recommendation to remove the prohibited item from the first package.

5. A system comprising:
a memory storing program instructions; and
a processor, wherein the processor is configured to execute the program instructions to perform a method comprising:
determining, using a machine learning module configured to perform photogrammetry techniques, package characteristics of a first package, wherein the package characteristics include a set of dimensions and a weight of the first package;

processing, using a natural language processor, a set of unstructured data to determine a transportation constraint associated with a transportation path, wherein the natural language processor is configured to tokenize the set of unstructured data such that a set of dimensional constraints and a weight constraint can be ascertained from the set of unstructured data;

comparing the set of dimensions and the weight of the first package to the set of dimensional constraints and the weight constraint of the transportation constraint;

determining, based on the comparison, that the package characteristics of the first package do not satisfy the transportation constraint;

issuing, in response to the determination that the package characteristics of the first package do not satisfy the transportation constraint, a reconfiguration recommendation to an individual associated with the first package;

requesting feedback from the individual regarding the determined weight of the first package;

receiving negative feedback from the individual based on an actual weight of the first package exceeding the determined weight by a first margin;

issuing, in response to receiving the negative feedback, negative reinforcement to the machine learning module configured to determine the package characteristics of the first package;

updating, based on the issued negative reinforcement, the machine learning module;

receiving a package update to the first package by the individual;

determining, using the updated machine learning module configured to perform photogrammetry techniques, updated package characteristics of the first package;

receiving an indication of an item to be prospectively purchased by the individual along a second transportation path;

analyzing the item using the updated machine learning module configured to perform photogrammetry techniques to determine dimensions and a weight of the item;

comparing the updated package characteristics of the first package including the item to a second transportation constraint associated with the second transportation path;

determining, based on the comparison, that the updated package characteristics of the first package including the item do not satisfy the second transportation constraint; and issuing, in response to the determination that the updated package characteristics of the first package including the item do not satisfy the second transportation constraint, a second reconfiguration recommendation to the individual associated with the first package, the second reconfiguration recommendation including a recommendation to remove the item.

6. The system of claim 5, wherein determining package characteristics of the first package includes:
identifying, via supervised machine learning classification, a second item;
searching for a matching item using the identification of the second item; and
referencing a specification describing the second item to ascertain a weight and a size of the item.

7. The system of claim 5, wherein the transportation constraint is a prohibited item, wherein the package characteristics of the first package indicate that the first package includes the prohibited item, wherein the reconfiguration recommendation includes a recommendation to remove the prohibited item from the first package.

8. The system of claim 5, wherein the transportation constraint is a package quantity limit, wherein the package characteristics indicate that the individual associated with the first package also has a second package, wherein the reconfiguration recommendation includes a recommendation to replace the first and second packages with a third package, the third package configured to house a plurality of items stored in the first and second packages.

9. A computer program product comprising a computer readable storage medium having program instructions embodied therewith, the program instructions executable by a processor to cause the processor to perform a method comprising:
determining, using a machine learning module configured to perform photogrammetry techniques, package characteristics of a first package, wherein the package characteristics include a set of dimensions and a weight of the first package;
processing, using a natural language processor, a set of unstructured data to determine a transportation constraint associated with a transportation path, wherein the natural language processor is configured to tokenize the set of unstructured data such that a set of dimensional constraints and a weight constraint can be ascertained from the set of unstructured data;
comparing the set of dimensions and the weight of the first package to the set of dimensional constraints and the weight constraint of the transportation constraint;
determining, based on the comparison, that the package characteristics of the first package do not satisfy the transportation constraint;
issuing, in response to the determination that the package characteristics of the first package do not satisfy the transportation constraint, a reconfiguration recommendation to an individual associated with the first package;
requesting feedback from the individual regarding the determined weight of the first package;
receiving negative feedback from the individual based on an actual weight of the first package exceeding the determined weight by a first margin;
issuing, in response to receiving the negative feedback, negative reinforcement to the machine learning module configured to determine the package characteristics of the first package;
updating, based on the issued negative reinforcement, the machine learning module;
receiving a package update to the first package by the individual;
determining, using the updated machine learning module configured to perform photogrammetry techniques, updated package characteristics of the first package;
receiving an indication of an item to be prospectively purchased by the individual along a second transportation path;
analyzing the item using the updated machine learning module configured to perform photogrammetry techniques to determine dimensions and a weight of the item;
comparing the updated package characteristics of the first package including the item to a second transportation constraint associated with the second transportation path;
determining, based on the comparison, that the updated package characteristics of the first package including the item do not satisfy the second transportation constraint; and
issuing, in response to the determination that the updated package characteristics of the first package including the item do not satisfy the second transportation constraint, a second reconfiguration recommendation to the individual associated with the first package, the second reconfiguration recommendation including a recommendation to remove the item.

10. The computer program product of claim 9, wherein determining package characteristics of the first package includes:
identifying, by extracting text from an image, a second item;
searching for a matching item using the identification of the second item; and
referencing a specification describing the second item to ascertain a weight and a size of the item.

11. The computer program product of claim 9, wherein the transportation constraint is a prohibited item, wherein the package characteristics of the first package indicate that the first package includes the prohibited item, wherein the reconfiguration recommendation includes a recommendation to remove the prohibited item from the first package.

12. The computer program product of claim 9, wherein the program instructions are downloaded to the computer readable storage medium from a distributed data processing system.

* * * * *